United States Patent [19]
Tauern

[11] 3,764,778
[45] Oct. 9, 1973

[54] CAPACITOR DISCHARGE STUD WELDING APPARATUS WITH COMPENSATED CHARGING CURRENT

[75] Inventor: Dankmar Tauern, Triesenberg, Liechtenstein

[73] Assignee: Hilti Aktiengesellschaft, Schaan, Liechtenstein

[22] Filed: Feb. 17, 1972

[21] Appl. No.: 227,041

[30] Foreign Application Priority Data
Feb. 19, 1971 Germany.................. P 21 08 104.9

[52] U.S. Cl............................ 219/131 WR, 219/113
[51] Int. Cl.............................................. B23k 9/10
[58] Field of Search.................... 307/109; 320/1; 321/47; 219/113, 131 WR, 98

[56] References Cited
UNITED STATES PATENTS 3,136,880  6/1964  Glorioso ................... 320/1 X
2,102,883  12/1937  Bouwers ...................... 320/1
1,506,698  8/1924  Waters....................... 219/116
2,342,628  2/1944  Evjen et al................. 321/47 X
2,459,858  1/1949  Westcott..................... 320/1
3,457,492  7/1969  Rabanit..................... 322/96

Primary Examiner—William M. Shoop, Jr.
Attorney—David Toren et al.

[57] ABSTRACT

In the apparatus disclosed, welding is accomplished by discharging a bank of capacitors through a pair of electrodes. A transformer energizes a rectifier bridge that charges the capacitor bank through a switching arrangement. The primary winding of the transformer is loosely coupled to the secondary winding, at least at higher loads on the secondary side. This eliminates the high current surge at the beginning of each charging cycle and minimizes the required current-carrying capabilities of the rectifier bridge and switching arrangement.

25 Claims, 20 Drawing Figures

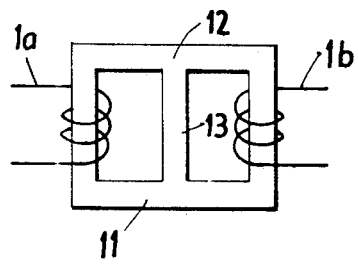
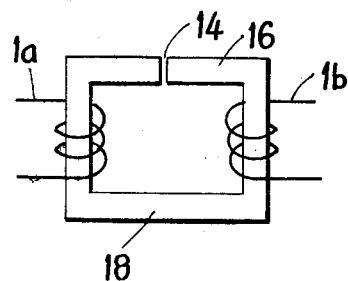
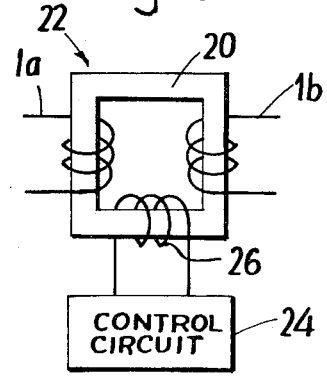
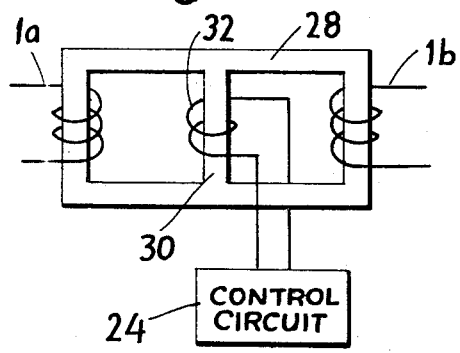
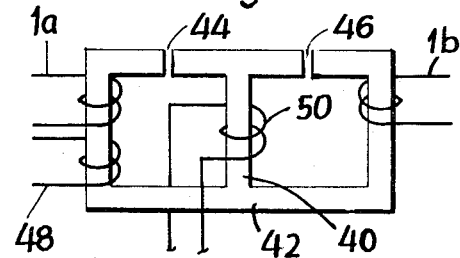
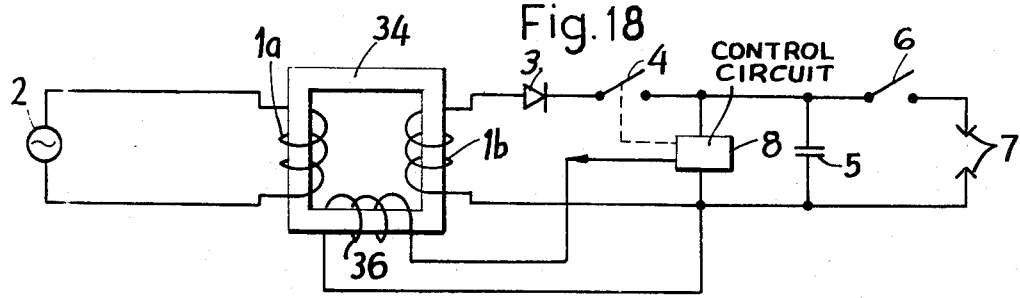
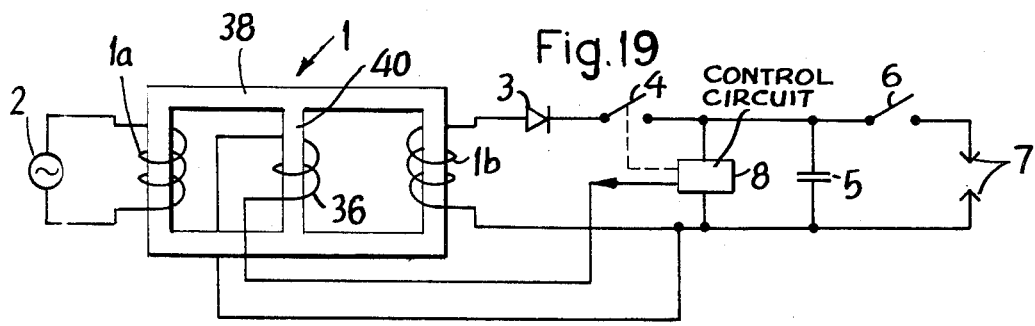

CAPACITOR DISCHARGE STUD WELDING APPARATUS WITH COMPENSATED CHARGING CURRENT

REFERENCE TO RELATED COPENDING APPLICATIONS

This application relates to the copending application of Dankmar Tauern and Karl-Max Harder, entitled Capacitor Discharge Stud Welding Apparatus, Ser. No. 227,040, assigned to the same assignee as this application, and filed on Feb. 17, 1972.

BACKGROUND OF THE INVENTION

This invention relates to electric capacitor-discharge bolt or stud welding devices.

In such devices a capacitor battery or bank stores the welding energy and supplies it to a welding line. A current supply charges the capacitor bank. The supply is composed of a transformer, whose primary winding is connectable to an alternating current network, and a rectifier system connected to the secondary winding of the transformer.

A current supply of the usual type normally charges a discharged capacitor bank of a stud welding apparatus. The voltage across the capacitor bank increases exponentially with time. Thus the curve of the capacitor charge relative to time corresponds approximately to the charge curve of a capacitor which is charged over a relatively small resistance from a constant voltage source. Accordingly, very high current flows at the beginning of the charging process. However, the current diminishes very rapidly. To limit the very high initial current somewhat, it is common practice to provide at least a small resistance in the charging circuit. Of course this prolongs the time for obtaining a given charge across the capacitor battery or bank. To keep the charging time short it is necessary to adapt the current supply section for correspondingly high initial currents. This results in supplies which may be bulky, heavy and costly in comparison to the power delivered by them.

Theoretically the charging voltage of a transformer is constant. However, practically, the voltage increases during the charging cycle. The voltage at the capacitor bank increases faster. Thus the charging current decreases substantially and very rapidly during the charging cycle and then fades out slowly. This slow fade draws out the charging process over a long period. Theoretically it draws out the charging current to infinity. A known way of avoiding the slow fade is to set the initial voltage at the current supply higher than the maximum theoretical charging voltage of the capacitor bank, and to stop the charging process when the theoretical voltage is reached. This limits the charging process to a finite time period. However, the circuit components are still subject to a high initial current. This high current determines the dimensions of the circuit parameter in the system.

An object of the invention is to improve stud welding devices.

Another object of the invention is to eliminate the before-mentioned deficiencies, in whole or in part.

Still another object of the invention is to provide a bolt or stud welding apparatus which can be made smaller, lighter and less costly than prior art devices.

SUMMARY OF THE INVENTION

According to a feature of the invention, some of these objects are achieved by loosely coupling the primary and secondary windings of the transformer supplying the energy to the capacitor bank, at least at higher loads on the secondary side.

Because of this feature the high current surges at the start of each cycle are avoided. At the same time, during most of the duration of the charging cycle, the secondary voltage of the transformer increases approximately proportionally to the voltage at the capacitor bank. Thus this produces an approximately constant charging current.

According to another feature of the invention the transformer structure corresponds to a short-circuit-proof transformer. According to another feature of the invention the transformer corresponds to transformers used for loads with negative resistance characteristics.

According to another feature of the invention use is made of a constant-current regulated transductor.

By virtue of the above features, despite a very small total resistance in the charging current, the apparatus according to the invention produces a charging current which is relatively low and approximately constant over a large part of the charging cycle. Because the charging current is relatively low from the very beginning of the charging cycle, as well as at later stages, all circuit elements located in the charging circuit such as switches, rectifiers, etc., need be able to carry only a relatively small charging current. This permits the use of lighter, smaller, and less costly circuit elements.

Despite these advantages the total charging time to a peak voltage is not appreciably lengthened, even when the charging process is not broken off. Only the initial charging surges are reduced.

According to another feature of the invention the charging process is broken off when the theoretical voltage of the capacitor battery is reached, on an approximate basis. With the charging process discontinued, because of the voltage increasing at the current supply with the charge of the capacitor, the entire charging process occurs relatively quickly despite the use of much smaller components.

According to another feature of the invention the transformer constitutes a stray field or leakage reactance transformer, i.e., a device known in Germany as a Streufeld-transformator.

According to another feature of the invention the transformer constitutes a two-leg transformer whose primary winding and whose secondary winding are mounted on separate legs of the transformer core. In the load range of the apparatus, these transformers operate so as to exhibit loose coupling. That is, they operate so that there exists a maximum number of ampere turns which remains approximately constant over a wide range of secondary voltages.

According to another embodiment of the invention the transformer includes a magnetic shunt operative between the primary and secondary windings. This permits regulating the degree of coupling. According to another embodiment of the invention the magnetic shunt is variable.

According to another feature of the invention the core of the transformer forms a ferromagnetic circuit having an air gap. The size of the air gap can be used to regulate the degree of coupling. According to another feature of the invention is air gap is combined with the magnetic shunt.

According to another feature of the invention, energy is fed to the rectifier bridge by a transductor regulated by a constant current.

According to still another feature of the invention auxiliary windings for the supply of other circuits are closely coupled to the primary winding of the transformer. To obtain a close coupling in a two-leg transformer, the auxiliary secondary windings can be wound on the same leg as the primary.

According to still another feature of the invention the no-load voltage of the transformer is above the maximum charging voltage of the capacitor bank. Suitable circuit means break off the charging process when the capacitor bank reaches the theoretical charging voltage. This construction limits charging to the initial area of the charging characteristic. When using a standard transformer it is precisely in this initial stage that the greatest current variations occur. Thus it is in this initial phase that the above described disadvantages occur most particularly. With a transformer having loose coupling, the charging current changes least in the first phase of the charging characteristic. Since the charging current stays at substantially the same value during the entire charge period, the invention permits short charging times and favorable component dimensions.

These and other features of the invention are pointed out in the claims. Other objects and advantages of the invention will become obvious from the following detailed description when read in light of the accompanying drawings.

BRIEF DESCRIPTION OF THE DRAWINGS

In the drawings:

FIG. 14 is a diagram of a transformer useable in FIG. 1 according to the invention wherein the loose coupling between the windings is achieved by a shunt.

FIG. 15 is a diagram of a transformer usable in FIG. 1 according to the invention wherein the loose coupling is achieved by a gap in the core.

FIG. 16 and FIG. 17 illustrate other transformers usable in the circuit of FIG. 1 according to the invention.

FIGS. 18 and 19 are schematic diagrams of other circuits embodying features of the invention.

FIG. 20 is a schematic diagram of a transformer suitable for use in the circuit of FIG. 1.

DESCRIPTION OF PREFERRED EMBODIMENTS

Figure 1:
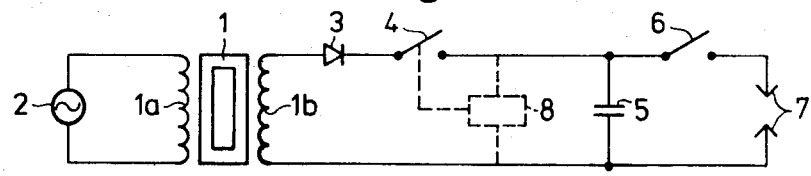
FIG. 1 is a schematic diagram of a stud welding apparatus embodying features of the invention.

In the stud welding device of FIG. 1 a two-leg stray field or leakage reactance transformer 1 receives energy from an alternating current source 2 through its primary winding 1a. The secondary winding 1b of the transformer 1 supplies the energy in the transformer to a rectifier 3 which rectifies the alternating current voltage. A charging circuit switch 4 applies the current from the rectifier 3 across a capacitor bank 5 whose capacitance remains constant for all the examples to be described. The capacitor bank 5 is to be charged to a predetermined voltage.

A welding current switch 6 triggers the welding process by closing, and thereby connects the capacitor bank 5 across welding terminals 7. The latter suitably engage the parts to be welded.

Figure 2:
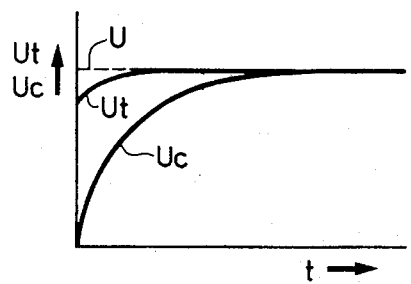
FIGS. 2 and 3 are voltage-time diagrams illustrating aspects of the operation of the circuit in FIG. 1 if the transformer in FIG. 1 were replaced by a transformer having tightly coupled windings, as is used in the prior art.
Figure 3:
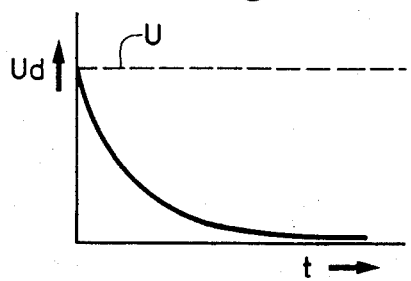
Figure 4:
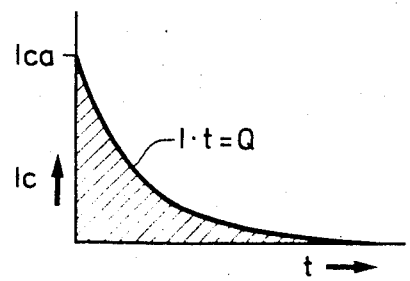
FIG. 4 is a current-time diagram illustrating aspects of the operation of circuit in FIG. 1 if the transformer in FIG. 1 were replaced by a transformer having tightly coupled windings.

Before describing the cycle for charging capacitor bank 5 with the apparatus shown in FIG. 1, the charging process using a normal closely coupled transformer in place of the leakage reactance transformer 1, will be described. FIG. 2 illustrates the curve of the voltage $U_t$ at the transformer and the voltage $U_c$ across the capacitor bank 5 during a charging cycle. FIG. 3 illustrates the difference in voltage $U_d$ between the voltages $U_t$ and $U_c$ over the same charging cycle. FIG. 4 illustrated the variation in charging current $I_c$ that charges the capacitor bank 5 during the same charging cycle. For purposes of this explanation it will be assumed that the capacitor bank 5 has been discharged, and the switch 4 closed to start the charging process. As can be seen from FIG. 2, the transformer with the close or tight coupling furnishes an almost constant voltage $U_t$ during the entire charging process. This voltage $U_t$ departs from its usual value only at the beginning of the charging cycle.

On the other hand, as shown in FIG. 2, the voltage $U_c$ across the capacitor bank 5 increases exponentially from the value zero of the discharged capacitor, to its maximum voltage $U_{max}$. The load current or charging current $I_c$ for the capacitor bank 5 which results from the difference voltage $U_d$ between the transformer voltage $U_t$ and the capacitor voltage $U_c$, decreases rapidly at an approximately exponential rate during the charging cycle. This is shown in FIG. 4. The value $I_c$ starts from an initial value $I_{ca}$ determined by the design of the transformer.

Figure 5:
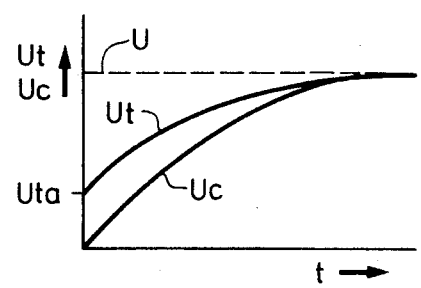
FIGS. 5 and 6 are voltage-time diagrams illustrating aspects of the operation of the circuit in FIG. 1 using a stray field transformer and embodying features of the invention.
Figure 6:
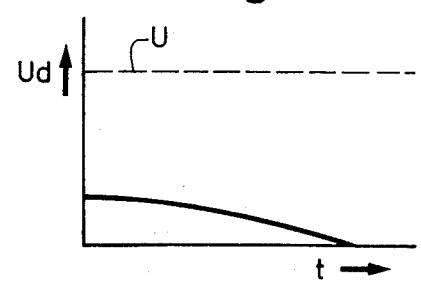
Figure 7:
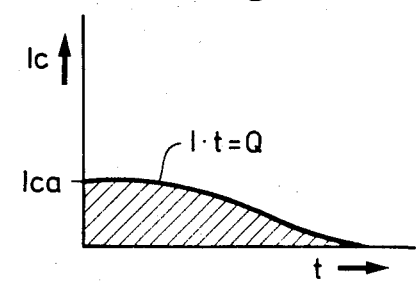
FIG. 7 is a current-time diagram illustrating aspects of the operation of the circuit in FIG. 1 using a stray field transformer as in FIGS. 5 and 6 and embodying features of the invention.

FIGS. 5 to 7 illustrate the variations of the same electrical parameters shown in FIGS. 2 through 4, during the same charging cycle, when the transformer 1 is a stray field or leakage reaction transformer as illustrated in FIG. 1. As is evident from FIG. 5, the stray field or leakage reactance transformer supplies a charging voltage $U_t$ which increases gradually from a relatively low initial value $U_{ta}$ to the maximum value $U_{max}$. The voltage $U_c$ at the capacitor bank 5 again increases, as shown in FIG. 5, from the value zero, but more slowly than as shown in FIG. 2, to the maximum value $U_{max}$.

The difference voltage $U_d$, which is shown in FIG. 6, varies much less than the difference voltage shown in FIG. 3. The charging current $I_c$ for the capacitor bank 5 thus decreases during the charging process as shown in FIG. 7. The decrease in the charging current is from an initial value $I_{ca}$, which is relatively low by comparison with FIG. 4. At first the decrease is very slow and then somewhat more rapid until it begins to decay approximately exponentially.

An inspection of the areas under the curves in FIGS. 4 and 7 illustrates the total charge Q of the capacitor bank 5 when the latter is charged using a normal tightly coupled or closely coupled transformer (FIG. 4) and when using a stray field or leakage reactance transformer (FIG. 7). Despite the much smaller initial current $I_{ca}$ produced with the stray field or leakage reactance transformer 1 the areas under the curves in both figures are substantially the same. Thus the total charge Q is the same for both conditions. That is to say the use of the stray field or leakage reactance transformer 1 in FIG. 1 results in the same total charge across the capacitor bank 5 as the tightly coupled transformer arrangement, despite the much smaller initial charge $I_{ca}$ with the stray field or leakage reactance transformer 1. Thus because of the lower initial charging current $I_{ca}$, the components in the charging circuit need be able to carry a far lesser current, thus permitting the use of smaller, lighter and less costly components. There maximum current ratings can be substantially lower.

The circuit of FIG. 1 can be adapted to break off or interrupt the charging process after a predetermined period of time or after attainment of a predetermined charging voltage $U_c$ at the capacitor bank 5. In the embodiment 8 of FIG. 1 this is accomplished by a control circuit which senses the voltage across the capacitor 5 and opens switch 4 when a predetermined voltage is reached.

Figure 8:
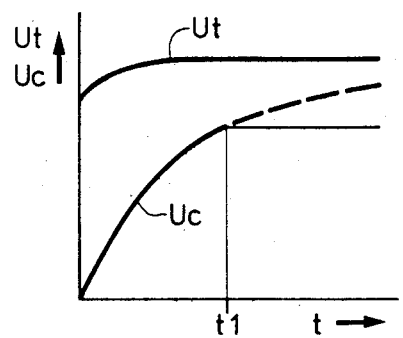
FIGS. 8 and 9 are voltage-time diagrams illustrating aspects of the operation of the circuit in FIG. 1 if the transformer of FIG. 1 were replaced with a transformer having tightly coupled windings and with the charging process broken off.
Figure 9:
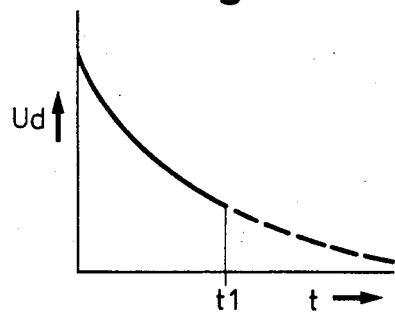
Figure 10:
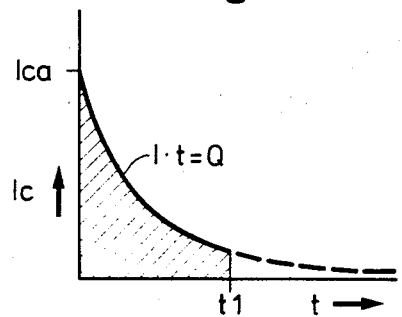
FIG. 10 is a current-time diagram illustrating aspects of the operation of the circuit in FIG. 1 if the transformer of FIG. 1 is replaced by a transformer having tightly coupled windings, such as in FIGS. 8 and 9, with the charging process broken off.

FIGS. 8 through 13 illustrate the voltage and current conditions for this mode of operation. FIGS. 8 and 9 illustrate the voltages which prevail during the charging process when, as in FIGS. 2 through 4, a transformer with closely coupled or tightly coupled windings replaces the stray field or leakage transformer 1 in FIG. 1. FIG. 10 illustrates the charging current that prevails under the same circumstances. The curve in FIG. 10 is comparable to the curve in FIG. 4.

In FIG. 8 the voltage $U_t$ supplied by the transformer is higher than the voltage $U_t$ supplied by the transformer as shown in FIGS. 2 through 4. Also in FIG. 8 the charging process is cut off or interrupted at the time $t_1$ before its natural decay. In this way the charging process can be cut off after a predetermined time. The effects of this are shown in FIGS. 9 and 10 as well as FIG. 8. Under these circumstances an initial surge current $I_{ca}$ which is still higher than that shown in FIG. 4 flows to the capacitor bank 5.

Figure 11:
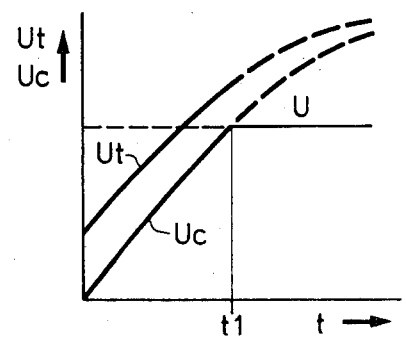
FIGS. 11 and 12 are voltage-time diagrams illustrating aspects of the operation of the circuit of FIG. 1 utilizing a stray field transformer embodying features of the invention, with the charging process broken off.
Figure 12:
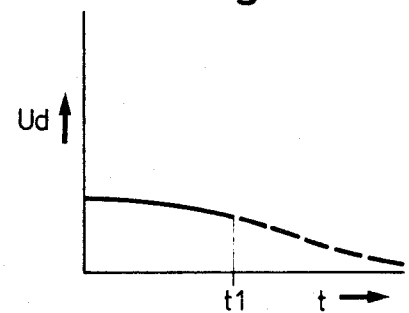
Figure 13:
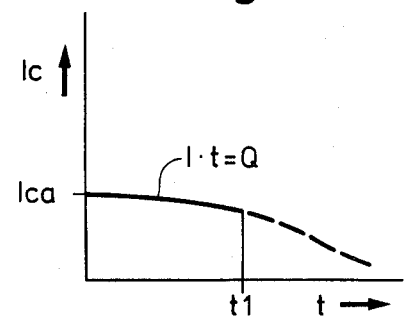
FIG. 13 is a current-time diagram corresponding to FIGS. 11 and 12 and illustrating an aspect of the operation of the circuit in FIG. 1 utilizing a stray field transformer and embodying features of the invention with a broken off charging process.

FIGS. 11 to 13 correspond to FIGS. 5 through 7 in that they illustrate the system of FIG. 1 using the stray field or leakage reactance transformer 1. However, in FIGS. 11 through 13 the effects of charging the capacitors 4 to a higher voltage $U_t$ and opening the switch after a time $t_1$, are shown. As is evident from FIG. 13 an almost ideal charging characteristic is obtained. The charging takes place with nearly constant current over the duration of the charge. The initial value $I_{ca}$ is substantially below the initial value $I_{ca}$ of the charging current according to FIG. 10.

Both when the capacitor bank 5 is charged to its peak value and when the charging process is interrupted, the transformer as well as the other components of the current supply may, because of the invention, be much smaller, lighter and cheaper. At no phase of the charging process do large current surges occur. When using a standard transformer the charging process starts intensively and then diminishes rapidly. When using the transformer 1, namely a stray field or leakage reactance transformer, the charging continues almost uniformly for most of the charging cycle. It comes very close to a theoretical optimum of a constant charging current, until the charging process is interrupted.

The circuit of FIG. 1 requires no protective resistances of any kind. The winding resistances in the transformer may be reduced to the structural minimum. This again results in shorter charging times and savings in cost.

Experiments have shown that with transformers embodying features of the invention the same charging time can be obtained, when the control circuit stops the charging process, as with a conventional closely coupled transformer two to two and one half times the size of the transformer according to the invention.

The only ohmic resistances in the charging supply according to the invention are formed by the windings of the transformer 1 itself. Since the conversion of electric energy into heat increases with the square of the current, by avoiding high current peaks which would occur at the beginning of the charging process with conventional transformers, a substantially lower thermal load is placed on the transformer constructed according to the invention. Thus the latter can be substantially smaller than heretofore.

The coefficient of coupling between the windings 1a and 1b may be between 50% and 3% during the maximum current flow. Preferably the range of coefficients lies between 20% and 5% during maximum current flow. Most preferably the embodiments disclosed have ranges between 17% and 10%.

FIG. 14 illustrates an alternate construction with a transformer 1 in FIG. 1. Here the transformer 11 includes a core 12 that carries the winding 1a and 1b. The core 12 includes a shunt 13 that produces the loose coupling required according to the invention.

In FIG. 15 the loose coupling required by the invention is provided by a gap 14 on a core 16 in a transformer 18 that replaces the transformer 1. The windings 1a and 1b again are coupled loosely in the transformer 18.

In FIG. 16 the core 20 of a transformer 22 replacing the transformer 1, but carrying the windings 1a and 1b, is saturable. A control circuit 24 controls the current through an auxiliary winding 26 on a core 20. The control circuit may be operated manually or automatically.

In FIG. 17 the transformer 1 of FIG. 1 is replaced by a core 28 which carries the windings 1a and 1b. A shunt 30 in the core 28 loosens the coupling between the windings 1a and 1b. The control circuit 24 of FIG. 16 controls a winding 32 around the shunt 30 so as to vary its saturation. In this way the coupling between the windings 1a and 1b is varied. It should be noted that in all of these FIGS. 14 through 17 the transformer illustrated fits into the circuit of FIG. 1 exactly as the transformer 1 by connection to the windings 1a and 1b. When so connected each of the transformers in FIGS. 14 through 17 form a new embodiment of the invention in FIG. 1.

FIG. 18 illustrates another embodiment of the invention illustrated in FIG. 1. Here the windings 1a and 1b are coupled to each other loosely by being wound around a saturable core 3. The saturation of the core is controlled by current through a winding 36 mounted on the core. The current through the winding 36 is regulated by a control circuit 8 that responds to the voltage across the capacitor bank 5.

FIG. 19 corresponds to FIG. 18 except that here a core 38 includes a saturable shunt 40. The winding 36 is wound around the shunt 40 and the current therethrough is controlled by the control circuit 8 on the basis of the voltage across the capacitor bank 5.

FIG. 20 illustrates a transformer usable in FIG. 1 according to the invention. Here a core 40 loosens the couplings between the windings 1a and 1b by means of a shunt 42 as well as two gaps 44 and 46. A winding 48 is tightly coupled to the winding 1a and may be used to control other operating circuits. A winding 50 about the shunt 42 may be used to saturate the shunt. The current to the winding 50 may come from a control circuit such as 24 in FIGS. 16 and 17 or from the control circuit 8 as in FIGS. 18 and 19.

The embodiments of FIGS. 14, 16, 17, 18, and 19 may also have one or more air gaps as needed.

The terms stray field transformer and leakage reactance transformer are used interchangeably to mean what is termed in German Streufeldtransformator. The terms stray field transformer and leakage reactance transformer are intended to mean exactly Streufeldtransformator.

While embodiments of the invention have been described in detail it will be obvious to those skilled in the art that the invention may be embodied otherwise without departing from its spirit and scope.

What is claimed is:

1. A capacitor discharge bolt welding apparatus, comprising capacitor means for storing electrical energy, welding means connectable to said capacitor means for utilizing the energy, charging means for charging said capacitor means, said charging means including rectifier means for receiving alternating current and applying direct current to said capacitor means current-limiting means in said charging means for transferring alternating current energy to said rectifier means and limiting the flow of alternating current to said rectifier means, said current-limiting means including transformer means having a primary winding and a secondary winding loosely coupled to each other.

2. An apparatus as in claim 1, wherein said windings exhibit a coupling coefficient of between 3% and 70%.

3. An apparatus as in claim 1, wherein said windings exhibit a coupling coefficient of between 5 and 20%.

4. An apparatus as in claim 1 wherein said transformer means is a stray field leakage inductance transformer.

5. An apparatus as in claim 1, wherein said transformer means has a core having two legs, said primary winding being wound on one leg and said secondary winding being wound on the other leg.

6. An apparatus as in claim 4, wherein said transformer means has a core having two legs, said primary winding being wound on one leg and said secondary winding being wound on the other leg.

7. An apparatus as in claim 1, wherein said transformer means includes a core, said windings being wound on said core, said core including a shunt between said primary and secondary windings.

8. An apparatus as in claim 4, wherein said transformer means includes a core, said windings being wound on said core, said core including a shunt between said primary and secondary windings.

9. An apparatus as in claim 6, wherein said core limits the coupling between the windings wound on said core, said core including a shunt between said primary and secondary windings.

10. An apparatus as in claim 1, wherein said transformer means includes a core, said windings being wound on said core, said core forming an air gap between said windings.

11. An apparatus as in claim 4, wherein said transformer means includes a core, said winding being wound on said core, said core forming an air gap between said windings.

12. An apparatus as in claim 6, wherein said core forms an air gap between said windings.

13. An apparatus as in claim 9, wherein said core forms an air gap between said windings.

14. An apparatus as in claim 1, wherein said transformer means includes a saturable core and an auxiliary winding, said auxiliary winding forming with said core a transductor for varying the degree of coupling between said windings.

15. An apparatus as in claim 4, wherein said transformer means includes a saturable core and an auxiliary winding, said auxiliary winding forming with said core a transductor for varying the degree of coupling between said windings.

16. An apparatus as in claim 6, wherein said core is saturable and supports an auxiliary winding, said auxiliary winding forming with said core a transductor for varying the degree of coupling between said windings.

17. An apparatus as in claim 9, wherein said core is saturable and supports an auxiliary winding said auxiliary winding forming with said core a transductor for varying the degree of coupling between said windings.

18. An apparatus as in claim 1, wherein said transformer includes an auxiliary winding closely coupled with said primary winding, further comprising control means for controlling the other circuits and connected to said auxiliary winding.

19. An apparatus as in claim 4, wherein said transformer includes an auxiliary winding closely coupled with said primary winding, further comprising control means for controlling the charging current and connected to said auxiliary winding.

20. An apparatus as in claim 6, wherein said transformer includes an auxiliary winding closely coupled with said primary winding, further comprising control means for controlling the charging current and connected to said auxiliary winding.

21. An apparatus as in claim 1, further comprising control means responsive to the voltage across said capacitor means for disconnecting said capacitor means when the voltage across said capacitor means reaches a predetermined level less than the voltage output of said rectifier means.

22. An apparatus as in claim 4, further comprising control means responsive to the voltage across said capacitor means for disconnecting said capacitor means when the voltage across said capacitor means reaches a predetermined level less than the voltage output of said rectifier means.

23. An apparatus as in claim 6, further comprising control means responsive to the voltage across said capacitor means for disconnecting said capacitor means when the voltage across said capacitor means reaches a predetermined level less than the voltage output of said rectifier means.

24. An apparatus as in claim 9, further comprising control means responsive to the voltage across said capacitor means for disconnecting said capacitor means when the voltage across said capacitor means reaches a predetermined level less than the voltage output of said rectifier means.

25. An apparatus as in claim 18, further comprising control means responsive to the voltage across said capacitor means for disconnecting said capacitor means when the voltage across said capacitor means reaches a predetermined level less than the voltage output of said rectifier means.

* * * * *